US012788686B2

(12) United States Patent
Bijlsma

(10) Patent No.: US 12,788,686 B2
(45) Date of Patent: Nov. 10, 2026

(54) MEDICINE UNIT CONTAINER FOR USE IN A MEDICINE UNIT

(71) Applicant: DD Innovations B.V., Liempde (NL)

(72) Inventor: Dennis Raymond Bijlsma, Tuk (NL)

(73) Assignee: DD INNOVATIONS B.V., Liempde (NL)

( * ) Notice: Subject to any disclaimer, the term of this patent is extended or adjusted under 35 U.S.C. 154(b) by 0 days.

(21) Appl. No.: 17/845,129

(22) Filed: Jun. 21, 2022

(65) Prior Publication Data

US 2023/0018753 A1 Jan. 19, 2023

(30) Foreign Application Priority Data

Jul. 16, 2021 (NL) .................................... 2028766

(51) Int. Cl.
*A61J 7/00* (2006.01)
*B65D 21/02* (2006.01)

(52) U.S. Cl.
CPC ........ *A61J 7/0076* (2013.01); *B65D 21/0212* (2013.01); *A61J 2205/10* (2013.01); *A61J 2205/60* (2013.01)

(58) Field of Classification Search
CPC ........ A61J 1/03; A61J 7/0076; A61J 2205/10; A61J 2205/60; B65D 21/0212; B65D 83/0409; B65D 2585/56
See application file for complete search history.

(56) References Cited

U.S. PATENT DOCUMENTS 922,888 A * 5/1909 Grunwaldt ............ A01G 31/02 47/14
3,498,471 A * 3/1970 Dirkx ................ B65D 21/0209 211/163
3,712,507 A * 1/1973 Holt ...................... G07F 11/54 221/150 R
4,208,021 A * 6/1980 Wall ...................... B65H 49/30 242/129
4,549,664 A * 10/1985 Gowan ................... B25H 3/06 206/508
4,809,877 A * 3/1989 Albright .............. A61J 7/0481 221/121

(Continued)

OTHER PUBLICATIONS

Copending Application of application No. NL2028490.

*Primary Examiner* — Gene O Crawford
*Assistant Examiner* — Kelvin L Randall, Jr.
(74) *Attorney, Agent, or Firm* — The Dobrusin Law Firm, P.C.; Eric S. Hydorn

(57) ABSTRACT

The present invention relates to a medicine unit container for use in a medicine unit delivery device comprising a container body, divided into a number of storeys by means of separating planes; wherein each storey is provided with a rotatable compartment housing, the compartments of which each cover at least a position equidistant in radial direction from a centre of the compartment housing and wherein all compartment housings are rotatable about a central axis extending through their centres and each of the separating planes comprises at least one passage between adjacent storeys, which passage covers the same radial position as the compartments so that there is a rotation angle of a compartment housing in which a compartment is aligned with the passage.

16 Claims, 5 Drawing Sheets

(56) References Cited

U.S. PATENT DOCUMENTS

| | | | | | |
|---|---|---|---|---|---|
| 4,811,764 | A * | 3/1989 | McLaughlin | A61J 7/0084 | 141/105 |
| 5,040,681 | A * | 8/1991 | Grusin | B43M 99/008 | 206/505 |
| 5,799,787 | A * | 9/1998 | Talbot | A01K 97/06 | 220/4.27 |
| 5,853,803 | A * | 12/1998 | Tateyama | G03F 7/162 | 427/336 |
| 6,016,927 | A * | 1/2000 | Krupp | A47B 49/004 | 211/126.2 |
| 9,757,794 | B1 * | 9/2017 | Martirossian | B22C 9/082 | |
| 11,756,750 | B2 * | 9/2023 | Mattarelli | H01H 3/50 | 200/5 R |
| 2004/0094564 | A1 * | 5/2004 | Papp | G06V 20/66 | 221/25 |
| 2013/0253700 | A1 * | 9/2013 | Carson | G16H 20/13 | 700/236 |
| 2015/0217930 | A1 * | 8/2015 | Holmes | G07F 11/32 | 221/1 |
| 2018/0177683 | A1 * | 6/2018 | van Wijngaarden | B65D 83/0454 | |
| 2021/0369563 | A1 * | 12/2021 | Gilson | A61J 7/0472 | |

* cited by examiner

MEDICINE UNIT CONTAINER FOR USE IN A MEDICINE UNIT

The present invention relates to a medicine unit container for use in a medicine unit delivery device. More in particular the invention relates to such container, intended for special purposes, that is, medicines that are not provided in bulk in a container because they are fragile, or (relatively) seldomly used, or that have a limited shelf life.

An example of a container for medicine units that can be provided in bulk is described in the Dutch patent application NL2028490 by the present applicant. The container disclosed in this application has appeared to be the most beneficial one for most medicine units, regardless of their shape and size.

There are special medicines however that are fragile, or (relatively) seldomly used, or that have a limited shelf life, and that should therefore not be stacked in the same space but handled with care.

The handling of these medicine units normally takes place manually, with the disadvantage that this handling becomes time consuming, cumbersome and expensive. When a patient requires multiple medicine units that are to be dispensed by a medicine unit delivery device, in particular for packing the medicine units, the addition of the fragile medicine units may be a bottleneck when it comes to speed.

Especially since medicine unit delivery devices are highly automated and configured for processing medicine unit recipes at high speeds, there is a need for a container for use in a medicine unit delivery device, which is compatible and/or exchangeable with containers for more regular medicine units, in order to be able to handle it with one and the same medicine unit delivery device.

It is a goal of the present invention to provide such container, or at least to provide a useful alternative to the state of the art. The container according to the invention is especially intended for, but not necessarily limited to medicine units that are to be contained in their blister package.

The invention thereto proposes a medicine unit container for use in a medicine unit delivery device comprising a container body, divided into a number of storeys by means of separating planes; wherein each storey is provided with a rotatable compartment housing, the compartments of which each cover at least a position equidistant in radial direction from a centre of the compartment housing, wherein all compartment housings are rotatable about a central axis extending through their centres, wherein each of the separating planes comprises at least one passage between adjacent storeys, which passage covers the same radial position as the compartments so that there is a rotation angle of a compartment housing in which a compartment is aligned with the passage.

The container comprises a number of compartments that can be filled with medicine units, and by rotating the compartment housings the medicine units can be moved through the container. When a medicine unit is outlined with a passage between adjacent storeys in a separating surface, it will fall through the passage and arrive one storey lower. It should be noted that a falling distance from storey to storey is relatively small with respect to the total height of the container. Additionally, there are no other medicine units in the same compartment, so that collisions between medicine units are excluded. The container serves as a shift-register for medicine units, in which each progress step is achieved by rotating the compartment housings over an angle that corresponds by a full turn divided by the number of compartments per compartment housing.

In general, the compartments may be equally sized and dimensioned, and all storeys may comprise the same compartment housing. The housing may comprise an intake opening for the medicine units which provides access to the storey that is the uppermost one in use, and at least one dispensing opening for medicine units that provides an exit or dispensing opening from the storey that is the lowermost in use.

By providing compartments for individual medicine units, the container allows delicate handling of the individual medicine unit, while being compatible with containers for dispensing medicine units that can be filled into a container in bulk form.

The central axis mentioned before may be a virtual axis or an actual shaft and may in the latter case be a separate part or be formed by interconnected parts, for instance projections integrally provided on the compartment houses.

In a preferred embodiment, the passages in successive separating planes are located at different angular positions about the central axis in order to prevent forming of a continuous channel. More preferably, in subsequent separating planes, they are rotated over an angle around the central axis, which angle corresponds with a full turn divided by the number of compartments per compartment housing. This way, the longest possible path is created. The compartment housings should then in use be rotated in a direction against the direction in which the passages are rotated. This way, a register is created that can house (the number of compartments per housing minus 1) times (the number of storeys).

In other words, the passages in successive separating planes are shifted one compartment size from each other, preferably against an intended direction of rotation.

The compartment housings may be connected to a central shaft to be rotatable together. This allows to shift the entire contents of the register simultaneously, which leads to the fastest possible response time of the medicine unit delivery device as a whole.

A drive engagement means for rotating the central shaft may be directed outwardly, so an external drive, for instance integrated in the medicine unit delivery device, can be coupled to the shaft.

The compartment housing may comprise radially extending baffles, in particular wherein pairs of adjacent baffles are at the same angle. The compartment housing may in general comprise at least one disc or be formed thereof or as such.

In case of one disc, the disc size is adapted to the size of the medicine unit. However, when there is a need for alternatingly using the container for different medicine unit types, a modular/configurable compartment housing is beneficial. In that case, the compartment size may be configurable by stacking multiple discs, each provided with means for maintaining their mutual angular orientation, either by gripping onto each other or onto a central shaft.

Such disc may in general comprise at least part of an annular projection or protrusion, coaxial with the disc circumference, for centring an adjacent separating plane with an at least partially form-fitting annular opening. This may in practice for instance mean an annular or interrupted annular shape. The height of the projection may or may herein essentially correspond to the thickness of a separating plane. The invention also relates to a combination or assembly of separating plane of any of the described types or configurations, and a compartment housing, comprising a disc having such at least part of an annular projection or protrusion, and a medicine unit comprising such combination or assembly.

In those embodiments wherein the compartment housing comprises multiple discs, those discs that are adjacent may preferably comprise identical interfaces for forming a smooth transition, or the discs may comprise a recess for receiving a protrusion from an adjacent disc. The presence of slits, gaps or the like may cause blister packages to get stuck. Different types of discs may be used for this purpose. The ones intended to engage a separating plate may comprise the before-mentioned annular projection, while the ones intended to engage another disc may lack such projection. The separator planes may comprises an annular rim for cooperating with discs having such recess.

In order to form closed spaces for medicine units, the separating planes and compartments may abut one another. The separating planes may be separate parts, such that any configuration and number of storeys and compartment housings can be selected and a modular container is obtained. Various compartment housings may be available, with various numbers of compartments and various heights, which match the size of medicine units to be dispensed.

The container body may further be provided with at least one intake opening for the medicine units; and at least one dispensing opening for the medicine units and a lid for the receiving opening, which is movable between an open position for supplying medicine units and a closed position for closing the container, the lid being lockable with the container at least in the closed position.

The lid may be irremovably connected to the container body, in particular such that the lid can be brought into the open position with the container body without detaching it from the container body, and more in particular wherein the lid is connected to the container body by means of a hinge.

The locking device may be provided with at least one barb which must be urged to the inside of the container for unlocking the lid, wherein an engaging surface of the barb for unlocking thereof is inside and preferably such, recessed relative to the container wall, so that manual opening is prevented. Preferably, the container comprises a plurality of barbs, in particular located in different walls or wall parts, so that the barbs have to be moved in different directions in order to unlock the lid.

The container may comprise a separated space for holding at least one reference medicine unit, wherein the separated space is provided with at least one transparent part adjacent to an outside of the container, for being able to visually determine from the outside that the medicine units in the space for holding the medicine units correspond to the medicine unit in the separated space.

The separated space may form part of or be included in the lid. The container may further be provided with a machine-readable identifier, such as a bar or QR code, an RFID tag, a chip or a magnetic code, in particular arranged in the lid. It may further comprise a cantilever for engagement by a robot, which cantilever is adapted to receive two spaced pins or hooks and which container is connected in particular to the lid.

The invention will now be elucidated into more detail with reference to the following figures, wherein.

FIGS. 5*a-d* show orientations of a separating plane in a container; and

Figure 5A:
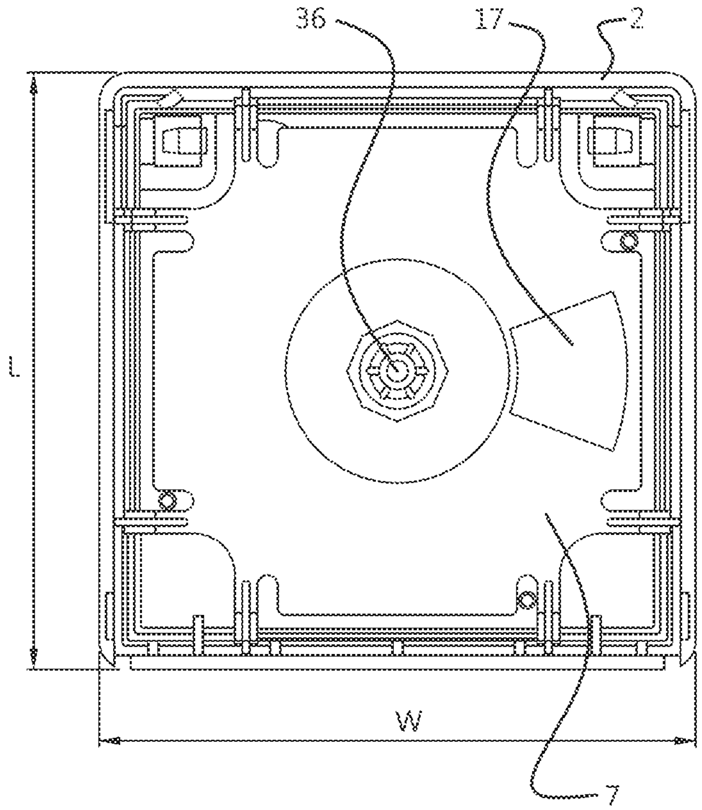
Figure 5B:
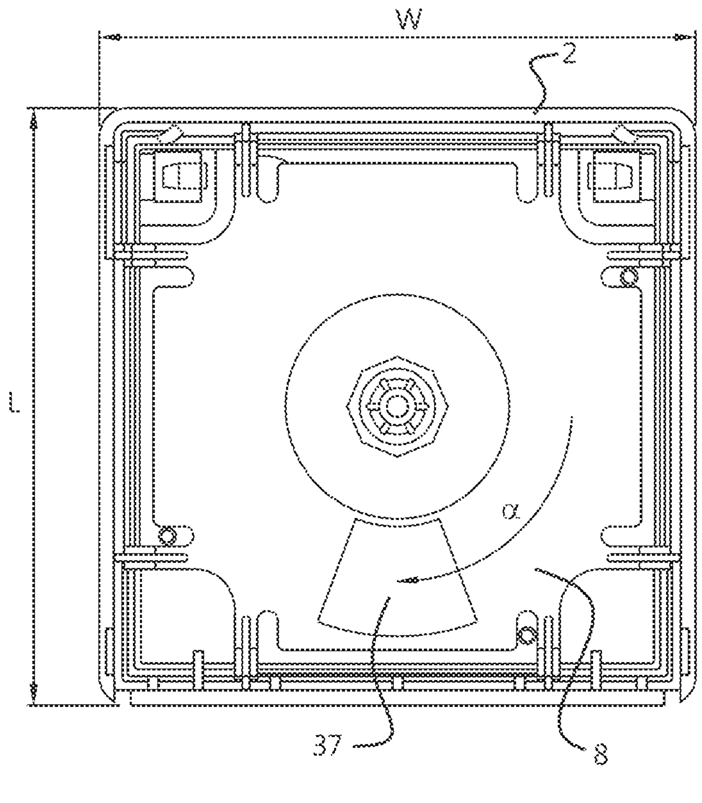
Figure 5C:
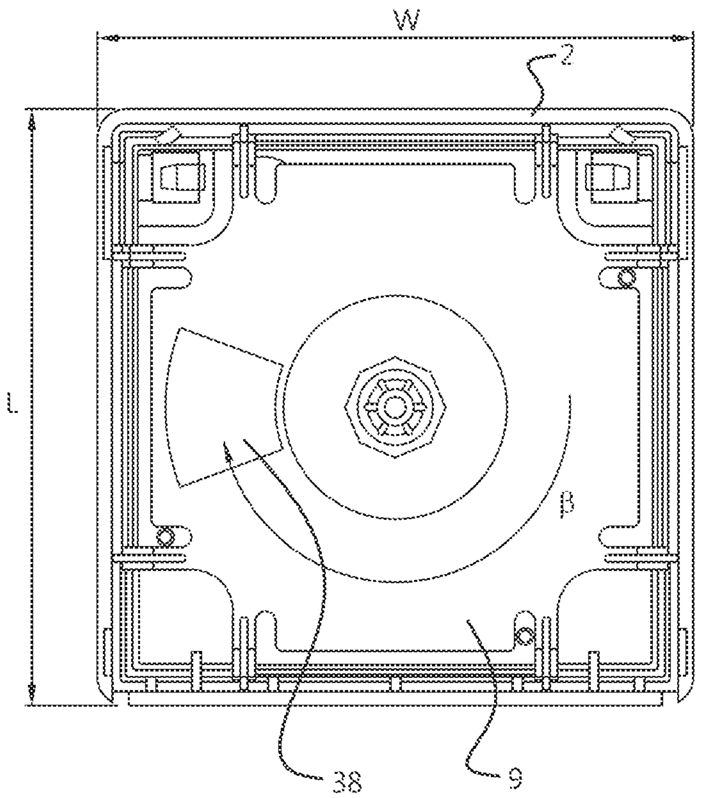
Figure 5D:
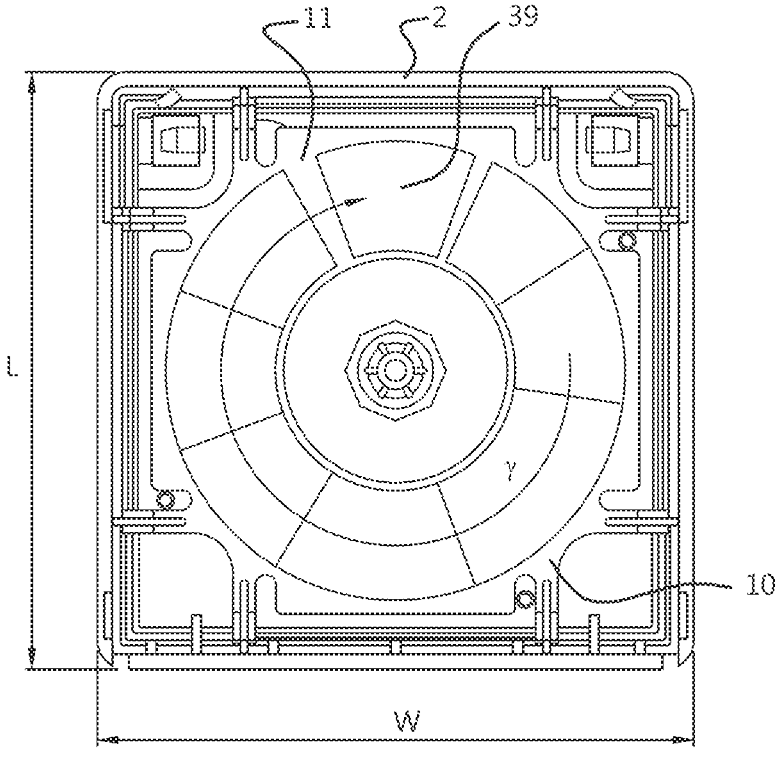
Figure 5E:
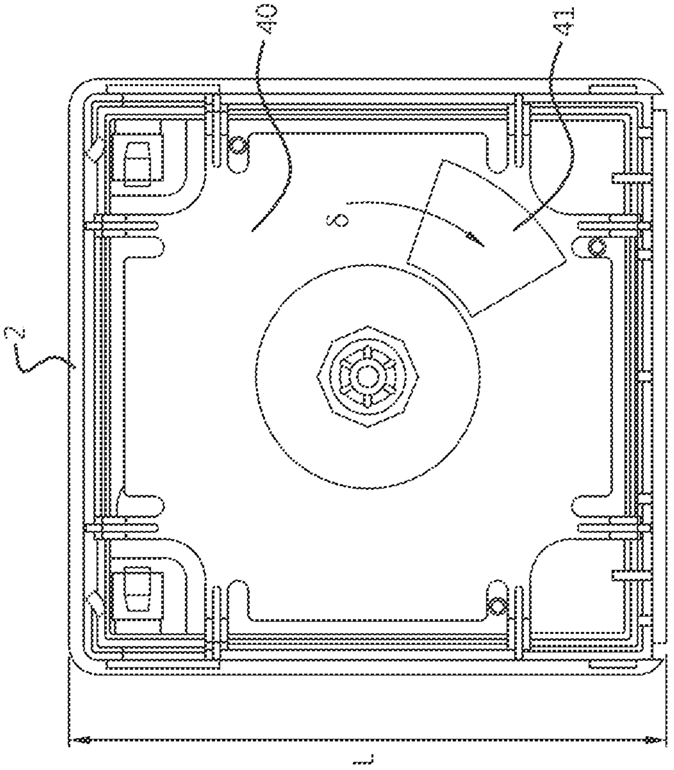

FIG. 5*e* shows an orientation of an alternative separating plane according to the invention.

Figure 1:
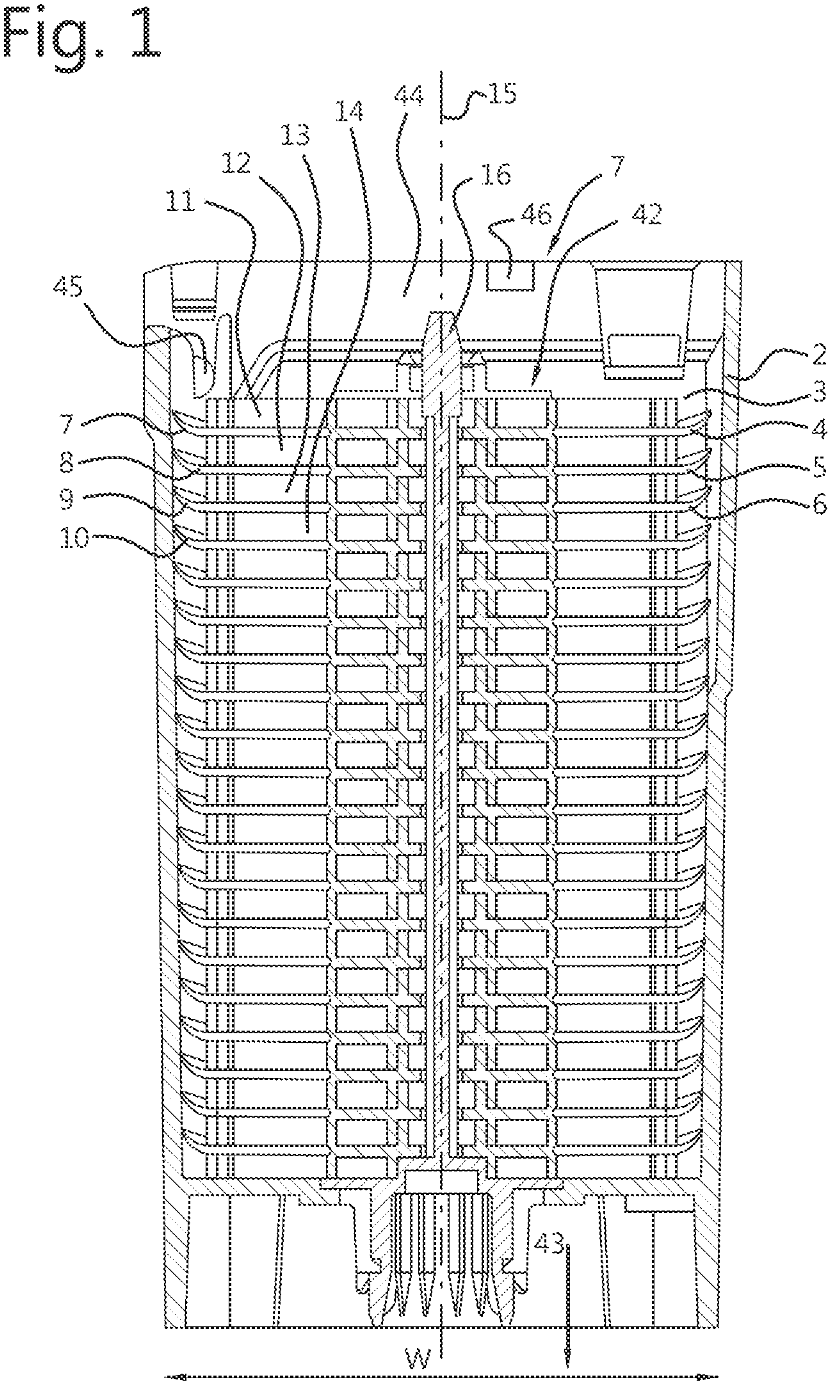
FIG. 1 shows a side view of a container according to the invention.
Figure 3:
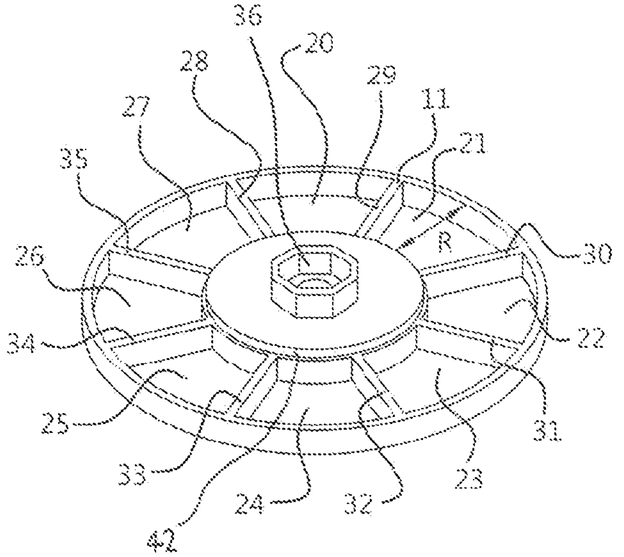
FIG. 3 shows a compartment housing according to the invention.

FIG. 1 shows a medicine unit container 1 for use in a medicine unit delivery device comprising a container body 2, divided into a number of storeys 3, 4, 5, 6 (and more) by means of separating planes 7, 8, 9, 10, wherein each storey is provided with a rotatable compartment housing 11, 12, 13, 14, the compartments of which each cover at least a position equidistant in radial direction from a centre of the compartment housing (explained into more detail with reference to FIG. 3). All compartment housings 11, 12, 13, 14 are rotatable about a central axis 15 extending through their centres. In the embodiment shown, the central axis is formed by a shaft 16.

Figure 2:
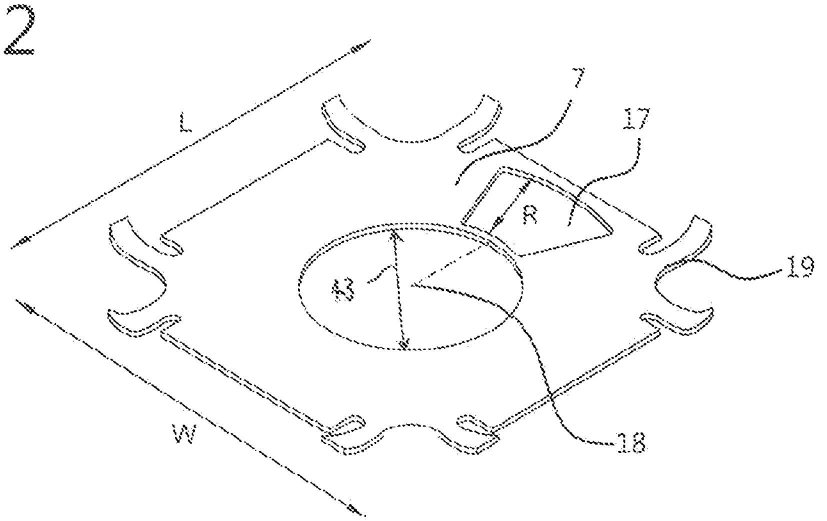
FIG. 2 shows a separating plane according to the invention.

FIG. 2 shows a separating plane 7 (which may be identical to the plane 8, 9, or 10. As visible in FIG. 1, the length L and width W of the separating planes corresponds to the internal length and width inside the container walls and the separating plane 7 comprises one opening 17 that may serve as a passage between adjacent storeys that are directly above and below the separating plane 17. As will become clear when comparing with FIG. 3, the passage 17 covers the same radial position R as the compartments of a compartment housing 11, so that there is a rotation angle of a compartment housing in which a compartment 20 is aligned with the passage 17. The separating plane also has a central opening 18, through which the shaft 16 may extend, and in which a protruding part of a compartment housing 11 (see FIG. 3) can be received. The outer contour 19 of the separating plane 7 may essentially or fully correspond with the inner contour of the container body 2 of the container 1 in which it is positioned. The separating plane 7 comprises a central annular opening 43 for form-fittingly matching a projecting annular shape 42 from a compartment housing, such as compartment housing 11 shown in FIG. 3.

FIG. 3 shows a compartment housing 11, formed as a disc with radially extending baffles 28-35. The baffles 28-35 define compartments 20-27, in which medicine units can be housed. The compartments 20-27 each extend to the same radial position R as the opening 17 in the separating plane 7, so that there is an angular position around the central axis 36 for every compartment 20-27 wherein its projection on the plane 7 overlaps or falls within the area of the passage 17, so that a medicine unit can fall through. Disc 11 comprises an annular projection 42, coaxial with the disc circumference, for centring an adjacent separating plane such as plane 7 from FIG. 2, with an at least partially form-fitting annular opening 43. The height of the projection 42 corresponds to the thickness of a separating plane. For this embodiment, but also in general, it goes that when compartment housings are formed by a stack of discs, such annular projection 42 does not need to be present in the interface between two adjacent discs.

Figure 4:
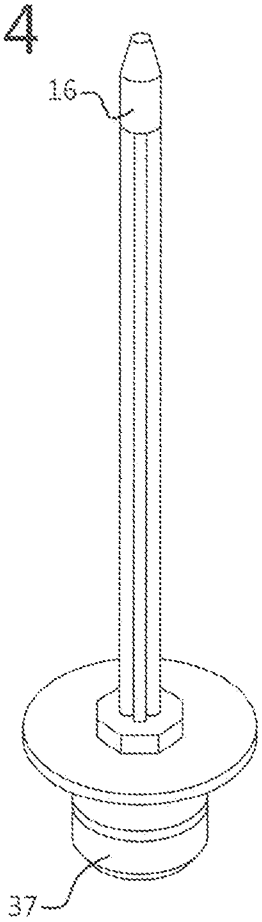
FIG. 4 shows a shaft according to the invention.

FIG. 4 shows a central shaft 16, on which the compartment housings and the separating planes can be alternatively placed, before the thus obtained assembly is placed in a container 1, as shown in FIG. 1. The shaft 16 can then be rotatably driven in order to rotate the compartment bodies. The separating planes are held in their position as they are blocked in their rotation by the walls of the container body 2.

FIGS. 5*a-d* show top views of separating planes 7-10 positioned in container housing 2 of container 1. When comparing the orientation of the separating plane 10 in FIG. 5*d*, separating plane 9 in FIG. 5*c*, separating plane 8 in FIG. 5*b* with separating plane 7 in FIG. 5*a* it is noted that planes 10, 9 and 8 are rotated over respective angles gamma, beta and alpha with respect to separating plane 7 in FIG. 5*a*. their respective passages 39, 38, and 37 are therefore also rotated with respect to passage 17 of separating plane 7. This is done to prevent a straight channel from the top of the container to the top. By rotating the separating planes 7-10 (and any subsequent ones) a register through which a medicine unit can be transferred along a helix shaped path is created. The embodiments shown in FIGS. 5*a*-5*d* make use of one and the same separating plane, which makes the design simple. The container may be optimally used when the passages are mutually rotated over the same distance as the compartments of a compartment housing. This can be done by alternatively using a separating plane as depicted in FIGS. 2 and 5*a-d,* and separating planes 40 according to FIG. 5*e*, wherein the passage 41 is rotated over an angle delta compared to the passage 17 from FIG. 5*a*. In the embodiments given, the angle alpha is two times the angle delta and the angle delta correspond with the angle between two baffles 28, 28 (but also any other adjacent pair) of the disc in FIG. 4.

Referring once more to FIG. 1, it is visible that the container body 2 is provided with an intake opening 42 for the medicine units and a dispensing opening 43 for the medicine units and a lid 44 for the receiving opening, which is movable between an open position (not shown) for supplying medicine units and a closed position (shown) for closing the container, the lid 44 being lockable with the container 2 at least in the closed position. The lid 44 is irremovably connected to the container body, by means of a hinge 45, and provided with a machine-readable identifier 46, such as a bar or QR code, an RFID tag, a chip or a magnetic code, in particular arranged in the lid.

The above examples are for explanatory purposes only and in no way limit the scope of protection as defined by the following claims.

The invention claimed is:

1. A medicine unit container for use in a medicine unit delivery device comprising:
- a container body defined by a central axis and comprising:
  - a plurality of separating planes dividing the container body into a plurality of storeys, each of the plurality of separating planes comprising:
  - at least one passage between the plurality of storeys that are adjacently located, the at least one passage of each of the plurality of separating planes being successively located at different angular positions about the central axis to prevent forming a continuous channel;
  - a plurality of rotatable compartment housings respectively located within the plurality of storeys and rotatable about the central axis extending through centres of the plurality of rotatable compartment housings, each of the plurality of rotatable compartment housings comprising:
    - one or more discs defining a plurality of compartments covering at least one position equidistant in a radial direction from the centres, the plurality of compartments each being defined by a compartment size, a first dimension of the compartment size being configurable by stacking multiple of the one or more discs, and the one or more discs comprising a central hole; and
  - a central shaft extending through the central holes of each and every of the one or more discs, and to which each and every of the plurality of rotatable compartment housings are connected so as to be rotatable together;
- wherein the plurality of rotatable compartment housings are a fixed part or formed from parts of the rotatable compartment housings;
- wherein the at least one passage of each of the plurality of separating planes cover a position in the radial direction respectively corresponding to the at least one position of each of the plurality of compartments so that there is a rotation angle of each of the plurality of rotatable compartment housings in which the plurality of compartments isare aligned with the at least one passage;
- wherein the at least one passage of each of the plurality of separating planes are successively shifted by a second dimension of the compartment size;
- wherein the one or more discs each comprise a projection extending from a first side thereof and a recess extending from a second side thereof, the projection and the recess being arranged around the central hole;
- wherein the one or more discs that are adjacently located form-fitting together and maintaining their mutual angular orientation by the projection being received by the recess thereby enabling modularity when there is a need for alternatingly using the medicine unit container for different medicine unit types;
- wherein the one or more discs comprise an annular projection, coaxial with a circumference of the one or more discs, the annular projection being received by the plurality of separating planes for centring thereto; and
- wherein the one or more discs comprise radially extending baffles having a first end centrally oriented and a second end distally oriented, wherein adjacent pairs of the radially extending baffles are at the same angle, and the second end of the radially extending baffles meet with a ring defining a circumference of the one or more discs.

2. The medicine unit container according to claim 1, wherein the projection and the recess have a complementary polygonal profile for maintaining said mutual angular orientation.

3. The medicine unit container according to claim 2, wherein the complementary polygonal profile is hexagonal.

4. The medicine unit container according to claim 3, wherein the central shaft comprises a projection, coaxial with the central hole, that form-fits with the recess of at least one of the one or more discs.

5. The medicine unit container according to claim 4, wherein each of one or more of the plurality of rotatable compartment housings comprise multiple of the one or more discs.

6. The medicine unit container according to claim 5, wherein the plurality of separating planes and the plurality of compartments abut one another.

7. The medicine unit container according to claim 6, further comprising a drive engagement means for rotating the central shaft, the drive engagement means being directed outwardly relative to the container body.

8. The medicine unit container according to claim 7, wherein the container body is provided with:
- at least one intake opening for medicine units;
- at least one dispensing opening for the medicine units;
- a lid for the at least one intake opening, which is movable between an open position for supplying the medicine units and a closed position for closing the medicine unit container, the lid being lockable with the medicine unit container at least in the closed position.

9. The medicine unit container according to claim 8, wherein the lid is irremovably connected to the container body via a hinge, such that the lid can be brought into the open position without detaching the lid from the container body.

10. The medicine unit container according to claim 9, provided with a machine-readable identifier in a form of a bar code or a QR code, an RFID tag, a chip, or a magnetic code.

11. The medicine unit container according to claim 10, wherein the machine- readable identifier is arranged in the lid.

12. The medicine unit container according to claim 11, wherein the one or more discs comprise eight of the plurality of compartments.

13. The medicine unit container according to claim 1, wherein each of the one or more of the plurality of rotatable compartment housings comprise multiple of the one or more discs.

14. The medicine unit container according to claim 13, wherein the central shaft comprises a projection that form-fits with the recess of at least one of the one or more discs.

15. The medicine unit container according to claim 14, wherein the projection and the recess have a complementary polygonal profile for maintaining said mutual angular orientation.

16. The medicine unit container according to claim 15, wherein the container body and the plurality of separating planes have complementary polygonal profiles thereby preventing relative rotational movement therebetween.

* * * * *